Nov. 30, 1937.  B. BEARDSLEY ET AL  2,100,585
BELT CONVEYER
Original Filed Dec. 31, 1931
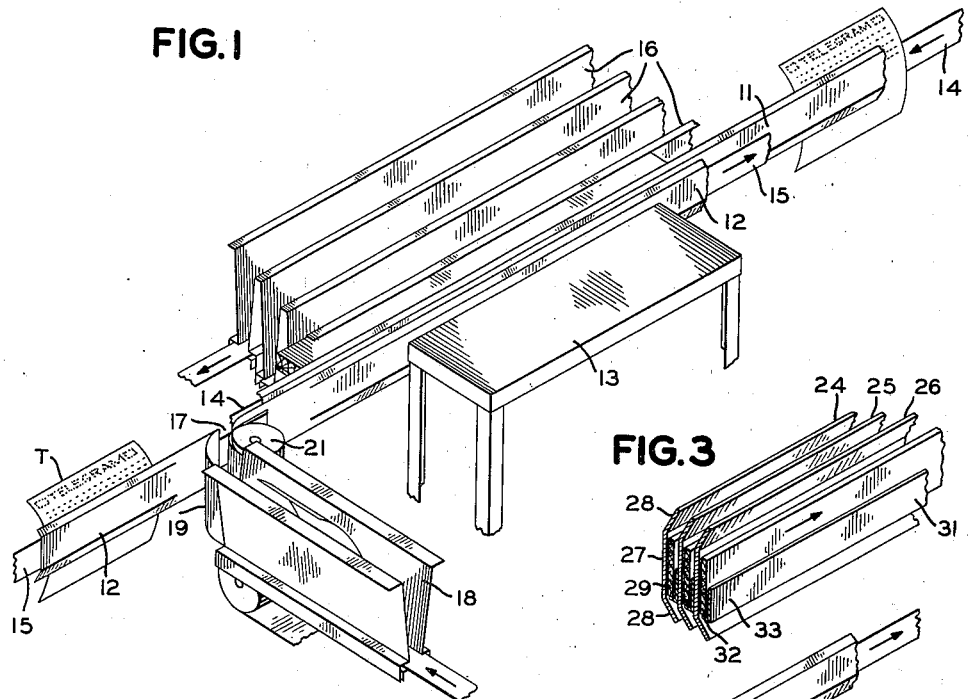
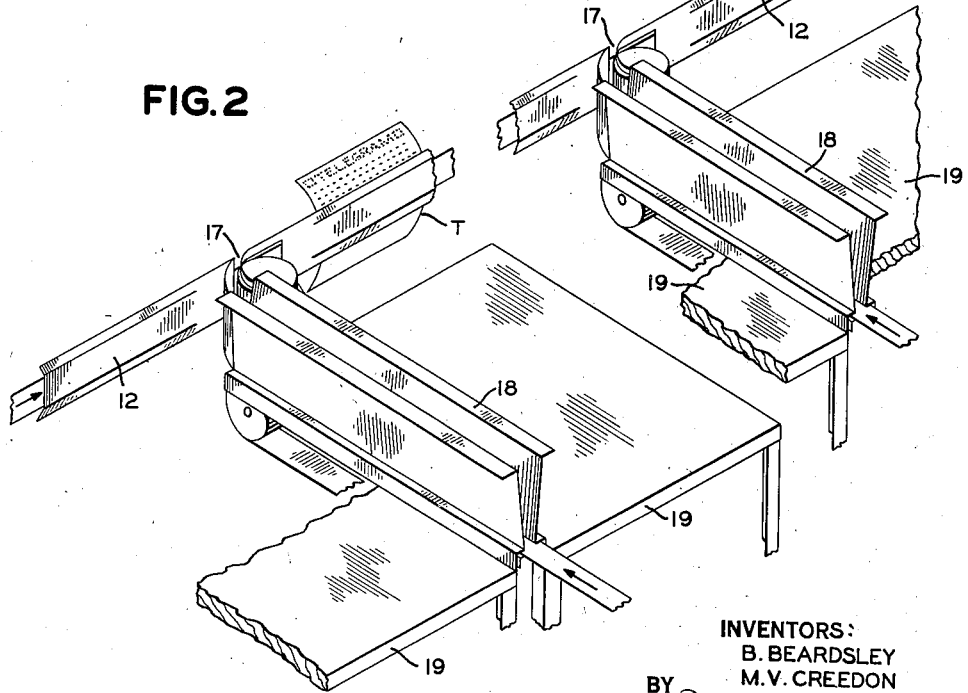
INVENTORS:
B. BEARDSLEY
M. V. CREEDON
BY Eugene C. Brown
ATTORNEY Patented Nov. 30, 1937

2,100,585

UNITED STATES PATENT OFFICE 2,100,585

BELT CONVEYER

Bruce Beardsley, Brooklyn, N. Y., and Michael V. Creedon, Westfield, N. J., assignors to The Western Union Telegraph Company, New York, N. Y., a corporation of New York Original application December 31, 1931, Serial No. 584,204. Divided and this application February 4, 1935, Serial No. 4,976

8 Claims. (Cl. 198—19)

This invention relates to conveyer systems for handling sheet material, such as telegram blanks, messages, and the like, and more particularly to systems employing conveyers arranged to transport sheets of material in a substantially upright or on-edge position. This application is a division of application Ser. No. 584,204, filed December 31, 1931, now Patent 1,992,349, entitled Belt conveyers.

A particular object of this invention is to provide means for effectively conveying sheet material from various sources to a main distribution center, at which point the sheets may be sorted and rerouted over a system of conveyers to their proper destination.

Another object is to provide a compact arrangement of on-edge drag conveyers.

A still further object is to provide a system of conveyers, including conveyers for feeding material into the on-edge drag conveyers, and other conveyers arranged to receive material withdrawn therefrom.

These and other objects are effected by our invention, as will be apparent from the following description and claims taken in connection with the accompanying drawing, in which:

Fig. 1 is a view showing a part of a system comprising two pick-up drag conveyers arranged as feeding conveyers at the back of the work table of a distribution center, a collecting conveyer discharging into one of the drag conveyers, and a group of distributing conveyers for receiving material withdrawn from the drag conveyers;

Fig. 2 is a view supplementing Fig. 1 and showing the collecting conveyers arranged at the backs of parallel rows of work tables; and Fig. 3 is a detail view showing a group of drag conveyers, such as employed in Figs. 1 and 2, arranged on-edge in nested relation.

Heretofore, when it has been desired to convey sheets of material to a distribution center to be sorted and distributed into various conveyers, it has been common to employ a broad flat belt conveyer upon the surface of which the messages are deposited from various feeding conveyers. The messages are picked off the belt by a group of routing clerks arranged longitudinally along one edge thereof, and are placed in one of a series of parallel V-trough conveyers extending along the back of the belt conveyer, according to their ultimate destination.

It has been found that this system does not provide a compact arrangement, and it limits the number of V-trough distributing conveyers that can be placed within easy reach of the routing clerks.

Our invention eliminates the broad flat conveyer belt, and substitutes in its place a plurality of on-edge drag conveyers arranged compactly in a parallel position.

One of the advantages of having the messages conveyed to the distribution center by means of the on-edge drag conveyer instead of the flat belt conveyer is that when a message is inserted in a drag conveyer, it is gripped by the conveyer belt and remains substantially in the same position as when it enters the conveyer system. Hence, when the messages are placed in a definite position, for example, with the address or other markings on the message in full view, they will arrive at the distribution center in the same position and may be readily withdrawn from the conveyers by sorting and routing clerks.

Ordinarily, only one flat conveyer belt may be conveniently employed at the distribution center. This is because the conveyer belt, feeding the messages into the distribution center, is disposed between the sorting clerks and the outgoing distributing conveyers, and therefore the amount of space occupied by the feeding conveyer determines largely the number of distributing conveyers that may be placed in easy reach of the sorting clerks beyond the feeding conveyers. Not only does the use of the compact drag type conveyer disposed on-edge enable a larger number of distributing conveyers to be employed, but the drag conveyers themselves may be disposed close together in a nested arrangement, thereby making it possible to feed into the distribution center from a plurality of feeding conveyers.

Another advantage of drag type feeding conveyers is that they may be operated at a substantially higher rate of speed than the usual, or flat belt type of conveyer and still permit the sorting clerks to distinguish and route the messages as they are carried through the distribution center.

Referring now to Fig. 1, the arrangement comprises two on-edge drag conveyers, 11 and 12, disposed in nested relation, and arranged to extend along the back of the work table 13, or otherwise suitably disposed in front of one or more sorting clerks. These conveyers are provided with belts 14 and 15 which may be arranged to travel either in opposite directions, as shown, or in the same direction. The construction of these conveyers is more fully shown in Fig. 3, and will be described later. This conveyer arrangement, together with the work table and the sorting clerks, comprises what is known in the art as a distribution center.

The sheet material, or telegram blanks T are fed into the drag conveyers, 11 and 12, from various sources and are conveyed to the distribution center where they pass before the sorting clerks who are familiar with the proper destination of telegrams having certain addresses. Provision is made for having all the messages faced in the proper direction, that is, with the address-side facing the clerks, as they pass the distribution center. The clerks, upon observing the telegram blanks passing before them, withdraw the same from the drag conveyers and drop them into the proper one of a plurality of V-trough conveyers 16 disposed in parallel fashion in back of the drag conveyers 11 and 12. These conveyers 16 represent the distributing conveyers and serve to carry the messages to their destination, from whence they are dispatched by retransmission or delivery as the occasion requires.

It is to be understood that the number of feeding conveyers for bringing the message to the distribution center is not limited to the two conveyers 11 and 12 shown. Several others may be suitably disposed between the distributing conveyers and the sorting clerks without crowding the space, due to the fact that each conveyer in an on-edge position occupies an extremely small amount of space. The feeding drag conveyers may be suitably arranged to extend in any direction to connect with other conveyers, or to collect material from a given area or point.

Suitable means for transferring the messages T to the drag pickup conveyers 11 and 12 may be provided by forming a slot or feed-in opening in the conveyer channel, such as the opening 17. Messages may be fed into this opening by hand, observing to hold the message with the address-edge up and suitably exposed above the conveyer channel, or the messages may be discharged into the slot from an adjacently disposed conveyer provided with suitable discharge guide means. In the illustration, a V-trough type conveyer 18 is disposed to discharge into the slot or opening 17 with the aid of suitable guide members 19 and 21 disposed to direct the messages into the slot. The conveyer 18 is shown as disposed at substantially right-angles to the drag conveyer 12, and at a suitable elevation to discharge the message blanks with the proper amount of the upper-edge exposed above the conveyer channel 12. By inserting the messages into the conveyer 18 in a suitable position, the address-side of the message will be toward the sorting clerks as it passes the distribution center. In the arrangement shown in the illustration, this would be with the message faced toward the right as it proceeds along the line of travel. As the message reaches the end of the collecting conveyer, it is guided into the pick-up conveyer 12 by a guide plate 19 at one side of the slot 17, and a roller 21 on the other side, disposed to rotate in engagement with the conveyer belt 15. As the message enters the slot 17, the forward edge is engaged between the roller 21 and the belt 15 and carried forward along the channel 12 of the drag conveyer. The arrangement may be suitably modified to adapt it to types of conveyers other than those shown. The pick-up or feeding conveyers, 11 and 12, may be extended horizontally in any direction to receive material from any desired number of other conveyers.

In Fig. 2 is shown an arrangement of a plurality of V-trough type conveyers 18, arranged at the back of substantially parallel rows of work tables 19. The rows of work tables may be single, with the conveyers along the center, or they may be arranged, as illustrated, in parallel rows. In this arrangement, V-trough conveyers serve to collect the messages from telegraph machines, or other means of origination, along the tables. The operators deposit the messages in the V-trough conveyers with the address-edge up, suitably faced, as already described. From the discharge of these conveyers the messages are received or picked up by the drag conveyer 12 arranged on-edge, and provided with suitable feeding slots 17 adjacent the ends of the respective collecting conveyers. Conveyer 12 in Fig. 2 is an extension of conveyer 12 of Fig. 1. Taken together, Figs. 1 and 2 diagrammatically represent a complete system. Conveyer 11 may likewise be extended to connect with one or more collecting conveyers.

Fig. 3 illustrates in detail a number of direct conveyers with other channels disposed in an on-edge position and arranged close together in nested relation. The arrangement comprises channel members 24, 25, and 26 extending longitudinally in the same direction and spaced from each other. Each of the channels comprises a longitudinally extending flat center portion 27, having joined thereto, along its edges, outwardly flaring side portions 28, disposed preferably at a relatively small angle to the central portion. Belts 29, corresponding to each channel member, are disposed on-edge and arranged to travel in substantial engagement with the surface of the central portion of each channel member. Each of the belts 29 is separated by a suitable angular guide member 31, the lower leg 32 of the angle member being arranged to provide a supporting guide along the lower edge of the belt. The upper leg 33 of the angle member is relatively wide and extends along the outer face of the belt for holding the belt in proper conveying relation to the channel. Each of the guide members 31 is supported independent of its corresponding channel member, and suitably spaced therefrom for permitting the belt to travel freely in the channel or slot embodied between the guide member and the corresponding conveyer channel member. The guide member 31 is entirely free from the channel member, and the lower leg is slightly spaced away from the face of the channel member to enable sheets of material being conveyed between the face of the channel member and the conveying surface of the belt to travel freely between the guide member and the channel member.

The sheets of material are carried along the channel member by frictional engagement between the sheets and the belt, the coefficient of friction between the sheets and the belt being considerably larger than that between the sheets and the channel. This causes the sheets to be carried along with the belt as it travels in substantial engagement with the channel. The outwardly flaring side portions of the channel cause the edge of the sheets to be bent outwardly from the plane of the central portion. By reason of the sheets being thus caused to assume a nonplaniform shape, they will be maintained in substantially constant engagement with the belt, even though the belt, due to irregularities in the shape of the channel member, is not maintained at all times in engagement with the central portion of the channel member. The action of the drag conveyer in this respect is substantially the same as that described in Patent #1,793,953, granted February 24, 1931, to F. E. d'Humy, et al.

From the foregoing description it will be observed that a conveyer system for the collection and distribution of sheet material, such as messages or telegram blanks, has been provided in which the messages are transported quickly and in definite order to the distribution center, and in which the arrangement of the distribution center permits the handling of the maximum number of messages in a given space. Also, it will be observed that a message distribution center has been provided employing a plurality of conveyers feeding messages into the center instead of one conveyer as heretofore. It will further be observed that the novel type of drag conveyer channel is especially adapted to be employed as a feeding conveyer in connection with a distribution center.

Although we have shown our invention in several forms, it will be obvious to those skilled in the art that it is not limited to the forms described, but is susceptible to various other changes and modifications without departing from the spirit thereof, and we desire, therefore, that only such limitations shall be placed thereon as are imposed by the prior art or as are specifically set forth in the appended claims.

We claim:

1. In a conveyer system, the combination of a drag conveyer disposed at a substantial angle to the horizontal, and comprising a channel member embodying an inlet slot through the back side thereof, a belt disposed to travel along the face of the channel and across said slot, a support for said belt engaging the lower edge of said belt longitudinally thereof, and another conveyer arranged to deliver sheets of material traveling substantially in an on-edge position to said first conveyer through said slot.

2. In a conveyer system, the combination of a drag conveyer disposed in an on-edge position and comprising a channel member embodying an inlet slot through the same, a belt disposed to travel along the face of the channel and across said slot, means engaging the lower edge of said belt longitudinally thereof for maintaining said belt in conveying relation to said channel member, and a V-trough conveyer arranged to deliver sheets of material, traveling in an upright position, to the first conveyer through said slot.

3. In a conveyer system for conveying sheet material, the combination of a V-trough conveyer, embodying an open end through which sheets of material are delivered in an upright position, and a drag conveyer joined to the open end of the V-trough conveyer, said drag conveyer embodying a conveyer belt arranged to travel across the open end of the V-trough conveyer for engaging the sheets of material delivered therefrom to carry the same along the drag conveyer and means extending longitudinally of said belt and engaging the lower edge thereof to maintain the same in conveying position.

4. In a conveyer system, in which sheets of material are collected from various locations and conveyed to a central point for sorting and distribution, the combination of a plurality of substantially parallel rows of work tables from which the sheets are to be collected, a plurality of first or collecting conveyers disposed along said rows of work tables to receive the sheets of material therefrom, said conveyers being arranged to deliver the sheets at one end of the rows of tables in an on-edge position, and a common second or pick-up conveyer of the drag type disposed in an on-edge position across the discharge end of the first conveyers, said pick-up conveyer being arranged with the back of the conveyer channel toward the discharge ends of the first conveyers, said conveyer channel embodying a slot corresponding to each collecting conveyer and disposed to receive the sheets in an on-edge position as they are discharged from said first conveyers, and a conveyer belt arranged to travel along the face of the pick-up conveyer channel and across said slots for engaging the sheets as they enter the slots and carrying the same forward to the central point and means engaging the lower edge of said conveyer belt for supporting said belt.

5. In a conveyer system, in which sheets of material are collected from various sources and conveyed to a central point for sorting and distribution, the combination of a plurality of work tables from which the sheets are to be collected, a plurality of collecting conveyers disposed along said work tables to receive the sheets of material therefrom and arranged to deliver the sheets at one end of said work tables in a substantially on-edge position, a common drag conveyer disposed in an on-edge position across the discharge end of the collecting conveyers, said drag conveyer comprising a channel member embodying a slot in the back thereof corresponding to each collecting conveyer, and arranged to admit sheets of material as they are discharged from the collecting conveyers, a belt arranged to travel along the face of said channel and across said slots, and means independent of said channel member for holding the belt in a position to engage said channel face.

6. In a conveyer system for sheet material, the combination of a plurality of longitudinally extending drag conveyers comprising a plurality of drag channel members disposed on-edge and in nested relation to each other, a corresponding number of belts arranged to travel in a substantially on-edge position along the channel face, and means disposed along said conveyer paths and engaging the lower edge of said belts for supporting said belts; a feed conveyer line leading to an intermediate point along at least one of said drag conveyers, a delivery juncture between said feed line and said drag conveyer at said intermediate point, and means for feeding the sheet material from said feed line into said drag conveyer for conveyance by the latter.

7. In a conveyer system for sheet material, the combination of a feed conveyer line, a plurality of drag conveyers comprising a plurality of drag channel members disposed adjacent each other in nested relation in a substantially on-edge position, belts corresponding to each channel member arranged to travel in engagement with said channel members for conveying sheet material between the channel members and the belts by frictional engagement with the latter, a feed-in opening formed in at least one of said channel members for admitting sheet material from said feed line into said drag conveyer, and means for laterally supporting the lower edge of said belts, said means being continuous across said feed-in opening.

8. In a conveyer system, the combination of a drag conveyer disposed in an on-edge position and comprising a channel member embodying an inlet slot through the same, a belt disposed to travel along the face of said channel member and across said slot, means for maintaining said belt in conveying relation to said channel, a V-trough conveyer arranged to deliver sheets of material to said drag conveyer inlet in a substantially upright position, and means for feeding said material through said slot into the drag conveyer whereby the plane of said sheets remains substantially upright in passing from the V-trough conveyer to the drag conveyer.

BRUCE BEARDSLEY.
MICHAEL V. CREEDON.